Figures 4, 5:
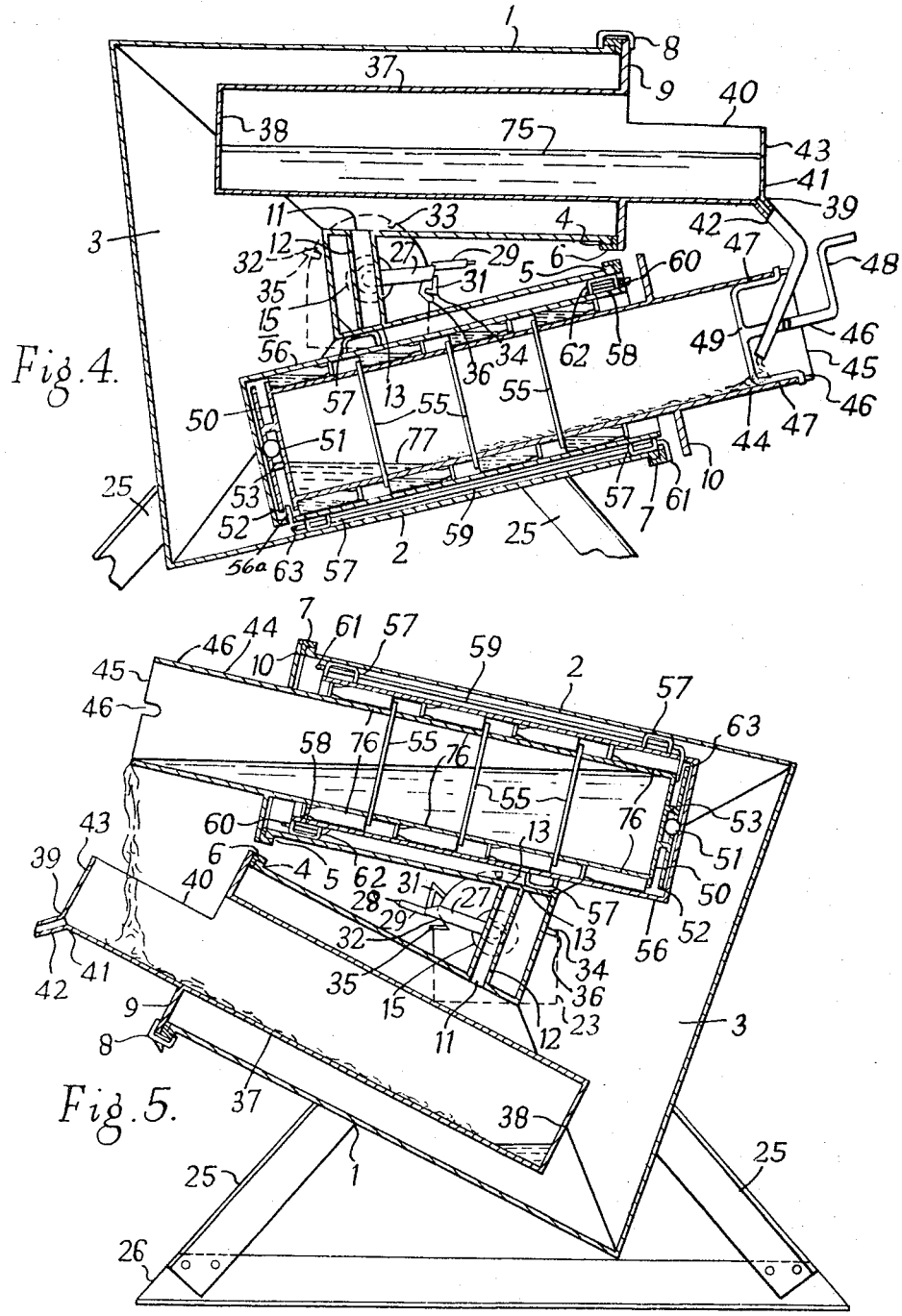

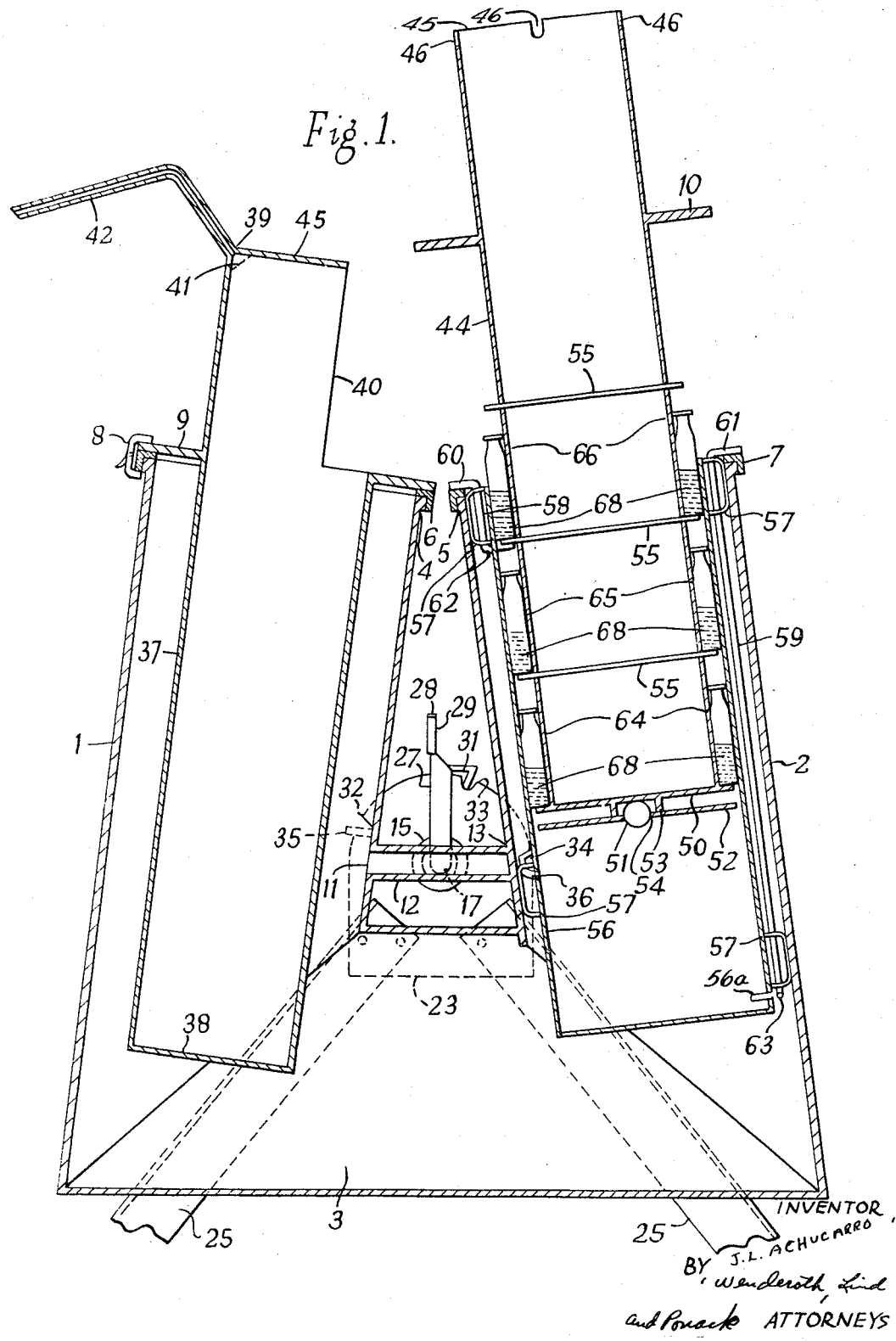

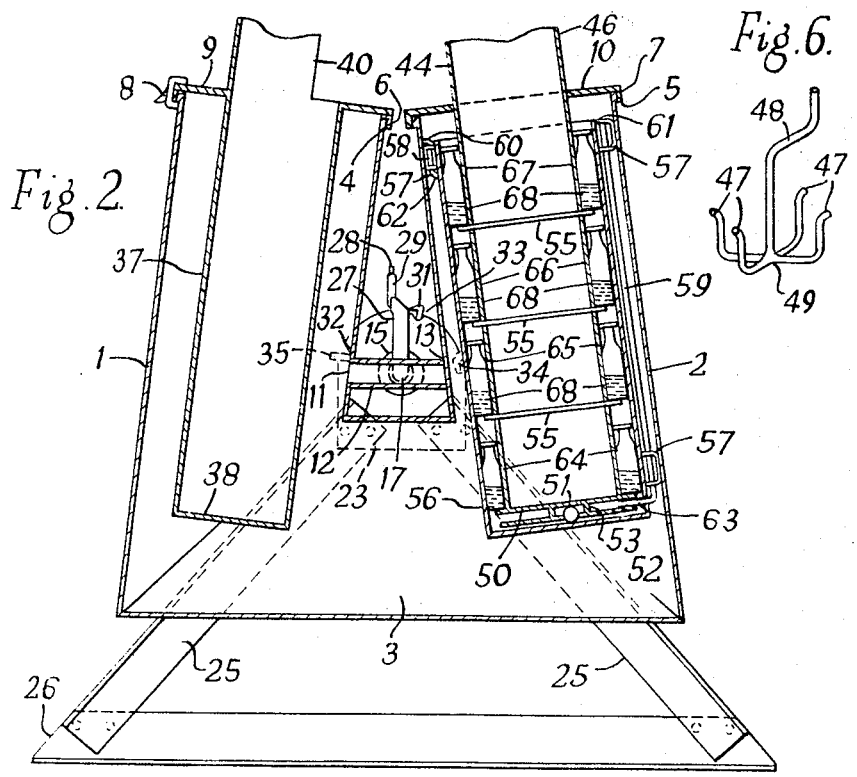
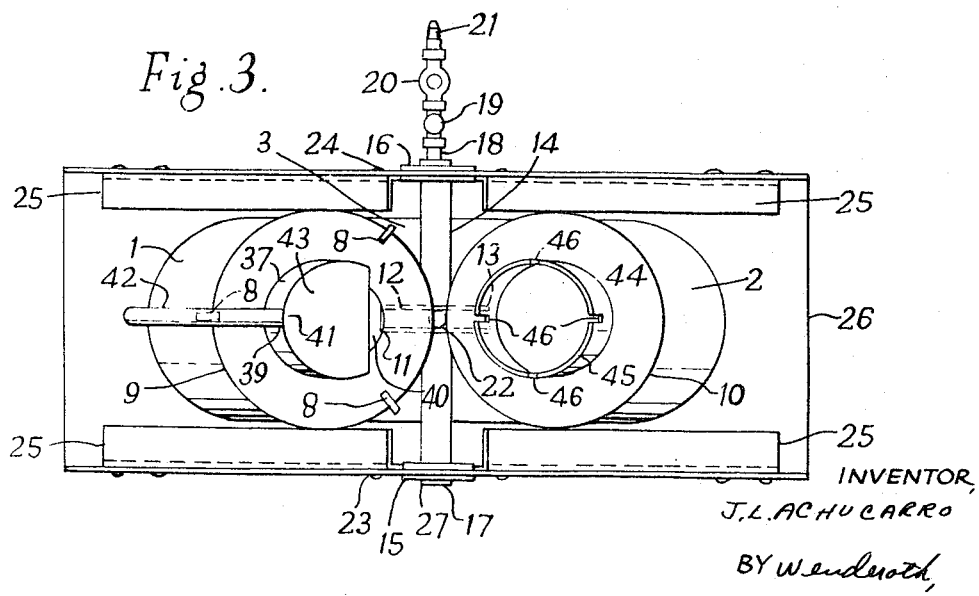

March 14, 1967 — J. L. ACHUCARRO — 3,308,551
FREEZE-DRYING APPARATUS AND METHOD
Filed Aug. 19, 1965 — 4 Sheets-Sheet 3

INVENTOR
J. L. ACHUCARRO
BY Wenderoth
Lind and Ponack ATTORNEYS

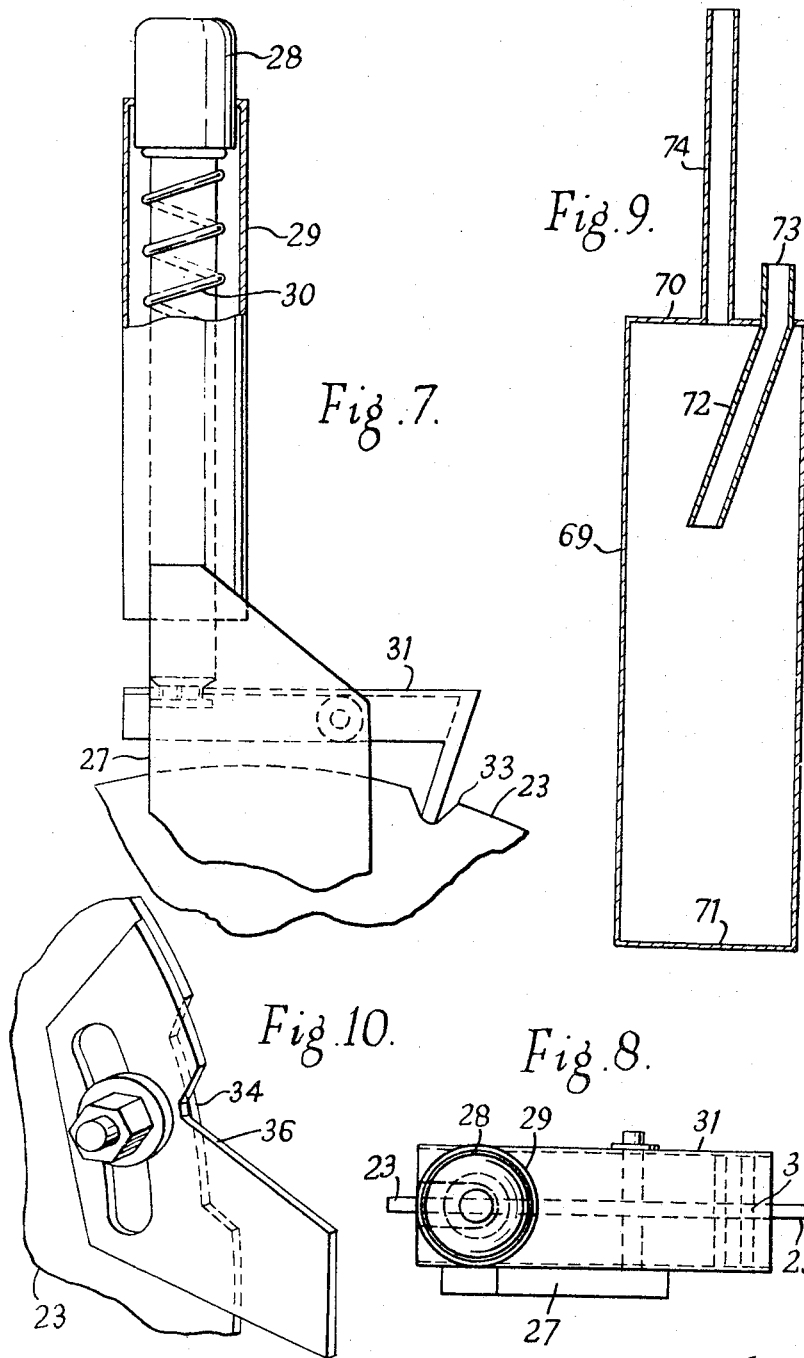

United States Patent Office 3,308,551
Patented Mar. 14, 1967

3,308,551
FREEZE-DRYING APPARATUS AND METHOD
Jose Luis Achucarro, 99 Wakehurst Drive,
Southgate, Crawley, Sussex, England
Filed Aug. 19, 1965, Ser. No. 480,914
Claims priority, application Great Britain, Aug. 26, 1964,
35,013/64
9 Claims. (Cl. 34—5)

This invention relates to freeze-drying apparatus.

The invention is concerned with a freeze-drying apparatus in which the substance to be dried is conveniently frozen in situ by using a fluid refrigerant and dried by the sublimation of the ice in the said substance under sub-atmospheric pressure.

The substance to be freeze-dried may be either solid or semi-solid, liquid or semi-liquid, organic or inorganic. When the substance is fluid it is usually, but not exclusively, disposed in cylindrical containers made from a rigid substance such as glass.

In freeze-drying it is very convenient to pre-freeze the substance to be dried in situ, i.e. in the drying chamber. When the said substance is dispensed in small containers this requisite is almost essential.

As hitherto practised the pre-freezing of ampoule contained material, in the drying chamber, previous to freeze-drying is usually carried out by what is described as "centrifugal evaporative freezing." In this method the ampoules with their contents are centrifuged with their axes slightly inclined towards the common axis of rotation, while the system is evacuated and water vapour removed so that the partial water vapour pressure in the drying chamber is eventually reduced to a value below the saturation vapour pressure of ice at the freezing point. The reduction in pressure inside the drying chamber increases the rate of evaporation and hence the rate of cooling of the remaining liquid substance due to the supply of the latent heat of vaporization for the evaporated liquid by the said remaining substance. When the liquid substance is distilled water initially at 20° C., simple calculation shows that, theoretically, the remaining water will freeze and reach a temperature of −20° C. when about 10% of the initial mass of water is evaporated. The actual value, in practice, is more like 20% of the initial amount or greater due mainly to the fact that the temperature of the containers is also reduced by the evaporating liquid, and that heat is continuously being transferred from the surroundings. The centrifuging is done mainly to eliminate the adverse effects of frothing and bubbling when evaporation and degassing of the liquid substance is taking place at sub-atmospheric pressure, and secondly to provide a cylindrical wedge of frozen substance which has larger exposed surface area and less average thickness than the same amount of substance when frozen in the form of a pellet at the bottom of its container. Large surface area and small thickness of frozen substance are two desirable drying features especially in freeze-drying.

Two serious criticisms which have been raised against this method are: (a) Centrifuging will cause components of the liquid substance to be separated in layers according to their respective densities and particle sizes, as is the case in the faster centrifuges used in laboratories and industry. (b) During the period of evaporative freezing no freeze-drying proper is taking place. Vacuum drying is present with all its inherent disadvantages, such as the presence of uniform and non-uniform concentrations of salts, electrolytes or any other components in suspension and/or in solution, inducing irreversible changes in the physical and chemical properties of the original substance. Also in the case of organic substances the difference between the external and internal pressures of the liquid substance may disrupt organised structures.

The "shell" method of pre-freezing which consists of partially immersing each container of the substance to be frozen in a cold bath, or exposing it to a blast of cold air, while rotating it slowly with its axis of rotation at an angle to the vertical so that the liquid substance freezes in contact with the internal wall of the container in the form of a shell overcomes all the aforesaid criticisms and has the additional advantage of providing a much larger exposed surface area and less thickness still than with the aforedescribed centrifugal evaporative freezing method.

Notwithstanding, the said shell method of pre-freezing as hitherto practised brings two main disadvantages of its own viz., external contamination of containers by the fluid refrigerant in which the containers are usually immersed when rotated, and accomplishment of pre-freezing of the substance remote from the drying chamber. These are the main reasons which hitherto have prevented the full exploitation of the inherent advantages of the method.

The object of the present invention is to provide apparatus for and a "shell" method of pre-freezing which has all the advantages of the aforesaid method as hitherto practised with none of its aforementioned disadvantages.

An embodiment of the invention will now be described by way of illustrative but not limiting example with reference to the accompanying drawings, in which:

FIGURE 1 is a sectional elevation partial view of the freeze-drying apparatus of the invention in the loading position, FIGURES 2 and 3 are respectively a sectional elevation similar to FIGURE 1 but of smaller scale and plan view of the freeze-drying apparatus in the operative position with one form of inner vessel and interspace canister, FIGURE 4 is a sectional elevation view of the freeze-drying apparatus at the commencement of pre-freezing, FIGURE 5 is a sectional elevation view of the freeze-drying apparatus when pre-freezing of the dispensed substance is finished and with the system under sub-atmospheric pressure, FIGURE 6 is a perspective view of a crank handle piece, FIGURES 7 and 8 are respectively a sectional elevation and plan view of a handle and position locator at the end of a lever, FIGURE 9 is a sectional elevation view of a heat exchanger, and FIGURE 10 is a perspective view of a form of adjustable stop for the component embodied in FIGURES 7 and 8.

Referring now to the drawings, as shown in FIGURES 1 to 5, the apparatus of the invention consists of two non-parallel cylinders 1 and 2 arranged with their axes at an angle of about 15° in a vertical plane and forming a condenser chamber and drying and pre-freezing chamber respectively. At their divergent ends the cylinders 1 and 2 are connected by a suitable duct 3. At their convergent open ends the cylinders 1 and 2 are reinforced by rectangular cross-section rings 4 and 5 welded externally round their rims. The rings 4 and 5 provide a convenient seat for the vacuum gaskets 6 and 7 which are L-shaped in section. The ring 4 on cylinder 1 forms a grip for lid clamping devices 8. The cylinders 1 and 2 have lids 9 and 10 and form with the connecting duct 3 an evacuable chamber.

A port 11 is formed on the inside wall of the condenser chamber 1 and leads to a short straight tube 12 connected symmetrically on to the facing side wall of the drying chamber 2. At this end 13 the tube 12 is blanked off by the side wall. This tube 12 forms both part of an evacuating line and a rigid bridge by which the cylinders 1 and 2 and their contents are supported. A horizontal tube 14 is provided at right angles to the tube 12 and to the vertical symmetrical plane of the freeze-dryer. This tube 14 is rigidly connected to the tube 12 and is internally in communication with the tube 12. The tube 14 is mounted at its ends in two bearings 15 and 16 so that the apparatus is carried to pivot about the axis of the bearings 15 and 16. The end of the tube 14 beyond the bearing 15 is blanked at one end 17. The other end of the tube 14 beyond bearing 16 is reduced in diameter leading to a vacuum isolation valve 19, a gas or air inlet valve 20 and a riffled nozzle 21 whereby it may be connected to the inlet of a, preferably rotary, vacuum pump (not shown) by suitably flexible vacuum tube. A vacuum gauge head 22 (see FIGURE 3) is mounted on the top central part of the tube axle 14. This gauge 22 can be interchanged with the gas or air inlet valve 20 at the other side of the vacuum isolation valve 19, if desired.

The two bearings 15 and 16 are fixed to two plates 23 and 24 which together with four struts 25 attached to a base plate 26 form a supporting frame.

A lever 27 is fixed to the axle 14 perpendicularly thereto at the blanked end 17 thereof. The lever 27 has a press-button 28 (most satisfactorily shown in FIGURE 7) at the free end of its handle 29. The press-button 28 acts on a locator 31 biassed by a spring 30 to engage in notches 32, 33 and 34 cut on the semi-circular edge of the plate 23 carrying the axle bearing 15.

By this arrangement the freeze-dryer can be tilted in its own plane in any position within a range of about 170°. The end positions of this range are defined by the locating notches 32 and 34 and stops 35 and 36. One stop 36 (see FIGURE 10) is adjustable. The apparatus may be positively located in a third or erect central position by spring-loaded locator 31 engaging in the centre notch 33 on the semi-circular edge of the bearing housing plate 23.

The condenser which is mounted concentrically in the condenser chamber 1 is of the "cold finger" type and consists of a cylindrical container 37 passing through and connected concentrically to the annular lid 9 of the condenser chamber 1. The condenser container 37 is closed at the lower end 38. At its upper end is a hole 39 and an opening 40 formed by the removal of part of the cylindrical surface opposite the hole 39 and the circular end 43. The hole 39 is protected by a filter 41 to stop any solid matter, particularly solid carbon dioxide pieces when this is used, from blocking the slightly bent pipe 42 at the edge of said container 37 to which the hole 39 leads.

Three clamping devices 8 placed equidistantly round the rim of the circular lid 9 of the condenser chamber 1 and the rectangular cross section ring 4 keep the lid 9 rigidly attached to the said condenser chamber 1 when the system is not under sub-atmospheric pressure. When the system is under sub-atmospheric pressure, atmospheric pressure acting on the outside only of the lid 9 is more than sufficient to fulfil this function.

An inner cylindrical vessel 44 is received inside the cylinder 2, passing through and connected concentrically to the lid 10 of the drying chamber 2.

The connections of the vessel 44 and condenser container 37 to their respective lids 10 and 9 are vacuum-tight and so are the closed lower parts 50 and 38 of both containers 44 and 37.

The cylindrical vessel 44 is open at the upper end 45 where it has four vertical, round-ended slots 46 regularly spaced round the rim 45. These slots are arranged to receive the four corresponding, hook-ended, parallel rods 47 which are radially attached to the lower end 49 of the central handle of a crank 48 to form the crank handle piece (see FIGURE 6).

The lower end 50 of the inner vessel 44 is closed and carries a thrust bearing consisting of a single ball 51. This ball 51 is free to rotate but is centrally retained at the circular undersurface 50 by a disc plate 52 which lies parallel to the surface 50 and which is attached to it by a short concentric tubular piece 53 housing the ball 51. The disc 52 has a central hole 54 of smaller diameter than that of the ball 51, and through which hole 54 a segment of the said ball 51 protrudes.

Flat, annular rings 55 are spaced regularly and fixed round the outer cylindrical surface of the inner vessel 44 for the purpose that will be described.

Between the inner vessel 44 and the drying chamber 2 there is a cylindrical interspace canister 56 which is open at the upper end. Spacers 57 fixed at regular intervals round the outer cylindrical surface of the interspace canister 56 keep it coaxially aligned with the cylinder 2. The spacers 57 also provide locators and bearings for two different, diametrically opposite inner and outer bolts 58 and 59 respectively, which bolts are mounted on the outside of the interspace canister 56. The canister 56 is placed inside the cylinder 2 in such a way that the bolts 58 and 59 lie in the plane of the freeze-dryer. The inner bolt 58 is the smaller of the two and is the nearer to the condenser chamber 1.

The bolts 58 and 59 consist of two rods arranged parallel to the axis of the canister 56 and passing through holes drilled in a pair of opposed spacers 57. The bolts 58 and 59 can rotate in their retaining holes but cannot move axially relative to the canister 56. The top ends 60 and 61 and bottom ends 62 and 63 respectively are bent at right angles to the rods (see FIGURE 4). The ends 60 and 62 of the inner bolt 58 lie in the same plane but in opposite directions like the horizontal arms of the letter Z. The ends 61 and 63 of the longer, outer bolt 59 are at right angles to the rod and to each other.

The function of the top arms 60 and 61 of both bolts 58 and 59 is identical, that is, to hook on the vacuum gasket 7 on the rim of the drying chamber 2 when they are positioned radially with respect to the said drying chamber 2 and to support in this way the interspace canister 56 and its contents. Either one of the arms 60 and 61 is sufficient to fulfil this function by itself. When these two top arms 60 and 61 are brought to their tangential position with respect to the interspace canister 56 (see FIGURE 2), the said canister will slide down inside the drying chamber 2, being no longer supported by the upper arms 60 and 61 of the bolts 58 and 59.

The canister 56 has slotted holes 56a in its side walls through which holes the lower arms 62 and 63 of the bolts 58 and 59 can be swivelled, as the bolts 58 and 59 are rotated. The lower arm 62 of the inner bolt 58 in its radial position is used to support the inner vessel 44 during loading and unloading containers 64, 65, 66 and 67 which may be either ampoules, vials, flasks, bottles or any other suitably rigid, cylindrical containers. This is effected by hooking said lower arm 62 under the base 49 of the said inner vessel 44 or under any of the annular rings 55 fixed round its outer cylindrical surface (as shown in FIGURE 4). At this stage the canister 56 is supported by the upper arm 61 of the outer bolt 59 hooked on the vacuum L-gasket 7 on the rim of the cylinder 2 by itself or in conjunction with the upper arm 60 of the inner bolt 58.

The lower arm 63 of the outer bolt 59 can engage in the space provided between the circular base 50 of the inner vessel 44 and the circular disc plate 52 to hold the canister 56 against axial displacement relative to the inner vessels 44. In this position the canister 56 is supported by the inner vessel 44 which rests its lid 10 on the vacuum L-gasket 7 on the rim of the drying chamber 2 (as shown in FIGURE 5).

In addition to the aforesaid slotted holes 56a the interspace canister 56 is provided with additional holes both on the cylindrical and on the circular surfaces for facilitating the passage of the water vapour coming from the frozen product 76.

With an interspace canister 56 of a given size, the diameter of the cylindrical containers 64, 65, 66 and 67 holding the substance 68 must fall inside a definite range, so that for containers 64, 65, 66 and 67 with a diameter outside this range an interspace canister 56 of different diameter has to be used.

A heat exchanger (shown in FIGURE 9) can, when required, provide heat for the sublimation of the ice in the frozen substance 76. This heat exchanger comprises a cylinder 69 which is closed at both ends 70 and 71 and which fits and fills that part of the inner vessel 44 below the lid 10. An inlet tube 72 is eccentrically fixed to the top lid 70 and is inclined inside the cylinder 69 until it meets the axis of the said cylinder 69 at a point about two-thirds of its way from the end 71, where the said inlet tube 72 ends. The part 73 of the inlet tube 72 on the outside is short and stubby and is parallel to the axis of the cylinder 69. An outlet tube 74 is also fitted to the top lid 70 of the cylinder 69. This tube is centered on a continuation of the cylinder axis and is external in its whole length, being long enough to be used as a handle for introducing and removing the said heat exchanger into and from the inner vessel 44.

In use the inlet tube is connected to the outlet of the vacuum pump (not shown) to be heated by the exhaust gases and also to act as a trap or arrester for the oil mist issuing from the exhaust of the vacuum pump.

The apparatus is used as follows: The apparatus is located in the erect central position by locator 31 engaging in notch 33. The containers 64, 65, 66 and 67 with their contents 68 to be freeze-dried, are loaded on to the rings 55 around the member 44 starting at the lowest tier (the loading stage is shown in FIGURE 1). The interspace canister 56 is hooked in the raised position by means of the two diametrically opposite bolts 58 and 59 mounted on it. This position of the interspace canister 56 with respect to the drying chamber 2 is used for loading, pre-freezing and unloading.

The cylindrical inner vessel 44 in the interspace canister 56 in the drying chamber 2 is raised to its highest loading position, so that the space corresponding to the lowest tier is accessible for loading the first ring of containers 64. The inner vessel 44 is locked and supported in this position by the lower arm 62 of the inner bolt 58 which just fits in the space between the undersurface 50 of the inner vessel 44 and its attached disc plate 52. The first ring of cylindrical containers 64 is inserted in the annular space between the interspace canister 56 and the inner vessel 44, the containers 64 being supported by the protruding edge of the circular base 50 of the inner vessel 44.

Once the lowest tier is loaded, the inner vessel 44 is lowered one stage or tier inside the interspace canister 56. This is carried out by supporting the inner vessel 44, releasing the lower arm 62 of the inner bolt 58, lowering the inner vessel 44 one stage and then locking the lower arm 62 of the inner bolt 58 underneath the annular ring 55 corresponding to this second tier.

The second ring of containers 65 is inserted similarly in the annular space provided between the interspace canister 56 and the inner vessel 44, the said containers 65 being supported by the annular ring 55 fixed on the outer cylindrical surface of the said inner vessel 44 corresponding to this second tier. The inner vessel 44 is then lowered one stage further in the same way as before and the next tier from the bottom is loaded, and the procedure continued until the last tier at the top is loaded.

Then the inner bolt 58 is rotated so that its top arm 60 is tangential to the interspace canister 56. This brings its lower arm 62 outside the said interspace canister 56 which is now supported only by the upper arm 61 of the outer bolt 59. The inner vessel 44 is now supported in the canister 56 by the ball thrust bearing 51 at the bottom 50 of the said inner vessel 44 and the cylindrical containers 64, 65, 66 and 67 on its periphery.

The cylindrical container 37 in the condenser chamber 1 is positioned with its lid 9 resting on the vacuum gasket 6 on the rim of the said condenser chamber 1 in such a way that the slightly bent pipe 42 has its free end inside the open end 45 of the inner vessel 44 in the drying chamber 2. The pipe is located slightly off centre of the vessel 44 to allow the insertion of the crank handle piece in the inner vessel 44 (as shown in FIGURE 4). The said lid 9 is now clamped to the condenser chamber 1 by means of the three clamping devices 8.

The liquid refrigerant 75 which can be either methylated spirit, alcohol, acetone or any other suitable liquid cooled by solid carbon dioxide or any other known means; or also any of the liquid gases normally used for this purpose, is placed in the condenser cylindrical container 37 up to maximum quantity determined by the size and shape of the freeze-drying apparatus.

The crank handle piece fits the inner vessel 44 and the bent ends of the four arms 47 engage in their corresponding, equally spaced slots 46 on the rim 45 of the inner vessel 44. By means of the crank handle 48 the inner vessel 44 is rotated, its weight being partially borne by the ball 51 thrust bearing and partially by the cylindrical containers 64, 65, 66 and 67 that happen to be under the said inner vessel 44. The said cylindrical containers 64, 65, 66 and 67 holding the substance 68 act also as bearing rollers for the inner vessel 44.

Next, the apparatus is tilted to its adjusted stop 36 (see FIGURE 10) position and located there (see FIGURE 4). The refrigerant starts to be fed by gravity, through the slightly bent pipe 42 into the inner vessel 44 in the drying chamber 2.

From the moment the feeding of the inner vessel 44 in the drying chamber 2 with refrigerant 75 from the condenser container 37 commences, the inner vessel 44 is manually rotated round its own axis at slow, uniform angular velocity by means of the crank handle 48 until freezing of the liquid substance 68 in the cylindrical containers 64, 65, 66 and 67 is completed. This rotation of the inner vessel 44 produces the rotation of the containers 64, 65, 66 and 67 round their own axes and also round the axis of the said inner vessel 44 contemporaneously with a precessional motion with respect to the said inner vessel 44. This motion besides bringing the liquid substance 68 into contact with all parts of the inner walls of the cylindrical containers 64, 65, 66 and 67 induces a very uniform cooling by the rolling contact of the said containers 64, 65, 66 and 67 with all parts of the periphery of the inner vessel 44. Both effects tend to ensure a uniform distribution of frozen substance 76 round the inner walls of the said cylindrical containers 64, 65, 66 and 67.

By making the stop 36 and the corresponding notch 34 adjustable (as shown in FIGURE 10), the angle of tilt of the apparatus for freezing can be chosen to suit the prevailing conditions depending on variables such as: shape and size of the containers 64, 65, 66 and 67 as well as the amount of the said substance 68 dispensed in each container. For a given shape and size of container 64, 65, 66 and 67 holding a fixed amount of the substance 68 this device controls up to a certain point the maximum thickness of the frozen substance 76.

When freezing is completed, the outer bolt 59 is positioned with its upper arm 61 tangential to the cylindrical surface of the interspace canister 56. This action both releases the interspace canister 56 from being supported by the said upper arm 61 and at the same time engages the lower arm 63 of the said bolt 59 in the space between the disc plate 52 and the circular base 50 of the inner vessel 44. Thus the canister 56 is now supported by the inner vessel 44, which is moved further into cylinder 2 until the lid 10 comes to rest on the vacuum gasket 7.

The substance 76 to be dried is by now "shell" frozen.

The apparatus is returned to the erected, central position by means of the lever 27. The crank handle piece is now removed, and the lid 9 of the condenser container 37 unclamped, rotated 180° round its own axis and secured again in position by means of the clamping devices 8.

The apparatus is then evacuated by the rotary vacuum pump which is fitted with gas ballast. When the pressure falls to the equivalent to the saturation vapour pressure of ice at the desired freezing temperature for the frozen substance 76 or below, the apparatus is carefully tilted in the opposite direction until the locator 31 meets the stop 35 and the corresponding notch 32. The liquid refrigerant 77 in the inner vessel 44 pours freely under gravity back into the condenser container 37 (as shown in FIGURE 5).

When no more liquid refrigerant 77 is left in the inner vessel 44 the apparatus which is still subject to subatmospheric pressure is restored again to the erected central position.

Drying proceeds with the apparatus in this position. This occurs when the frozen substance is heated in the evacuated apparatus. The substance is preferably heated at a rate which is sufficient to cause the frozen substance 76 to dry at the predetermined temperature of sublimation of the frozen substance. This temperature is preferably chosen to be just below the eutectic temperature of the substance for the optimum rate of freeze-drying.

The rate at which heat is gained from the apparatus surroundings may be sufficient for this purpose. More often, however, the rate at which heat is gained in this way is not sufficient for this purpose and additional heat must be supplied. Yet again, there are circumstances, for example, when freeze-drying biological tissues with a relatively high solid content or when the water available—ice when frozen—is remote from the surface and/or the latter is rather impervious (such as when freeze-drying whole specimens of frogs, birds or small mammals) the rate of heat gained from the surroundings is excessive. Under these circumstances the required temperature of sublimation for the substance under process can be maintained by keeping some liquid refrigerant 77 at the appropriate temperature in the inner container 44.

When the rate at which heat is gained from the surroundings is insufficient to keep the frozen substance 76 drying at the predetermined temperature of sublimation of the said frozen substance 76, the shape and disposition of the drying chamber 2 makes it readily adaptable to admit a large variety of alternative types of heating. Suitable types of heating are:

(i) Electrical resistance heating which may be in the form of an enveloping cover on the outside of the drying chamber 2, or as a heating element coaxially supported inside the inner vessel 44, or a combination of both. Thermostatic control can be used in each case.

(ii) Static fluid heating in the form of a suitable liquid introduced into the inner vessel 44, at an initial determined temperature which will decrease gradually as the drying process, using the heat stored in the said suitable liquid, proceeds. The effect of the temperature change coincides with the varying heating requirements at different stages during the sublimation of the ice crystals (primary drying).

(iii) Dynamic fluid heating which may, for example, be in any of the following forms:

(a) Forced air convection inside the inner vessel 44 produced by an eccentrically mounted fan at the rim 45 of the inner vessel 44.

(b) Controlled water flow with syphoned outlet in or fitted to the inside of the inner vessel 44.

(c) Controlled water flow in removable heat exchanger fitted to the inside of the inner vessel 44.

(d) Using the removable heat exchanger illustrated in FIGURE 9 fitted into the inner vessel 44 and connected by pipe of heat insulating material to the outlet of the rotary vacuum pump fitted with gas ballast, and by any suitable pipe to the outside. In this way some of the otherwise waste heat produced by the pump is utilized for drying. The heat exchange acts, as described above, in the double capacity of a heat exchanger and a trap or arrester of the oil mist coming from the exhaust of the vacuum pump.

At any time during the pre-freezing of the substance 68 or during the subsequent drying period more refrigerant 75 or 77 or more solid carbon dioxide, as applicable, can be added either to the condenser container 37 or to the inner vessel 44 as required.

At the end of the drying cycle, after the interruption and removal if necessary of any means of supplementary heating, air or an inert gas is admitted into the system through the air or gas inlet valve 20 and the vacuum pump is stopped and/or isolated by the isolating valve 19 at the same time.

Unloading proceeds in the reverse order from loading—i.e. the first tier to be unloaded is the top one. The interspace canister 56, load 64, 65, 66 and 67 and inner vessel 44 are raised from the vacuum L-gasket 7 where the inner vessel 44 lid 10 was resting. Then the outer bolt 59 is rotated in such a way that its upper arm 61 hooks on to the vacuum L-gasket 7 on the rim of the drying chamber 2, in the same way as for loading and prefreezing. By this action the canister 56 is directly supported by the drying chamber 2 and not through the intervention of the inner vessel 44, which now although supported by the canister 56 (through the ball thrust bearing 51 and containers 64, 65, 66 and 67) is no longer positively engaged with the said canister 56.

The inner vessel 44 can now be raised and supported in position by engaging the lower arm 62 of the inner bolt 58 under the flat annular ring 55 corresponding to the top tier to remove the top ring of containers 67. When this top ring of containers has been removed the inner vessel 44 is raised further to the next stage to remove the second ring of containers 66, counting from the top. The same procedure is repeated with the remaining rings of containers 65 and 64 in the proper order.

Defrosting of the condenser 37 at the end of the drying cycle is easily carried out by removing the said condenser 37 from the condenser chamber 1 and emptying it of refrigerant 75. Then by externally bathing the container 37 in water, by spraying it with water, or by internal flooding with water, all the condensed ice will be removed in a few seconds.

The dimensional dependance between $d_0$, $d_1$, $d_2$ and $d_3$, which represent respectively the outside diameter of the containers 64, 65, 66 and 67 ($d_0$), the outside diameter of the inner vessel 44 ($d_1$), the outside diameter of the supporting annular ring 55 ($d_2$) and the inside diameter of the interspace canister 56 ($d_3$), can be found by solving the system of simultaneous inequalities obtained by considering the following, functional, restrictive conditions:

(1) To ensure that the gap between the annular supporting rings 55 and the inside surface of the interspace canister 56 never becomes so large as to allow the passage of the containers 64, 65, 66 and 67 through the said gap when the interspace canister 56 is loaded with the said containers 64, 65, 66 and 67, $$d_1+d_2>2(d_3-2d_0) \qquad \text{(i)}$$

(2) To ensure that the containers 64, 65, 66 and 67 can be loaded all round in complete rings, $$d_3>d_1+2d_0 \qquad \text{(ii)}$$

(3) To prevent the annular supporting rings 55 coming into contact with the interspace canister 56 when the said interspace canister 56 is properly loaded with the containers 64, 65, 66 and 67 holding the substance 68, $$d_1+2d_0>d_2 \qquad \text{(iii)}$$

Solving these three simultaneous inequalities in terms of $d_0$ and $d_1$ we obtain:

From (i) and (ii), $$d_2>d_1 \qquad \text{(iv)}$$

which was already obvious, and together with (iii) gives the limits for $d_2$, $$d_1 + 2d_0 > d_2 > d_1 \quad (v)$$

From (i) and (iii), $$d_1 + 3d_0 > d_3 \quad (vi)$$

which together with (ii) gives the limits for $d_3$, $$d_1 + 3d_0 > d_3 > d_1 + 2d_0 \quad (vii)$$

Now for the dimensioned design $d_0$ is usually known. According to the number of containers 64, 65, 66 and 67 required, the surface area of the inner vessel 44 and hence its outside diameter $d_1$ can be calculated.

Then the value of $d_2$ will be obtained from (v) and the consideration of other possible future values of $d_0$.

The value of $d_3$ will be chosen from the range given by (vii) and the same said consideration as for $d_2$.

Liquid or semi-liquid substances held in containers of non-cylindrical shape can also be freeze-dried in the unmodified apparatus as here described by attaching them to the outside of the inner vessel 44, using the middle tiers and reserving the top and bottom tier for appropriate rollers, if necessary—empty cylindrical container could fulfil this function. Elastic bands or nets can advantageously be used to attach the non-cylindrical containers holding the substance to be freeze-dried to the middle tiers of the inner vessel 44. Except for loading and unloading, the handling of the freeze-drying apparatus is the same as in the case of cylindrical containers 64, 65, 66 and 67 holding the substance 68. Of course, once frozen, the distribution of the substance round the inside walls of the non-cylindrical containers will not be so uniform and regular as in the case of the cylindrical containers 64, 65, 66 and 67.

Slabs or small discrete pieces of solid or semi-solid substances can be dealt with in the same manner.

Obviously if the freeze-drying apparatus is to be extensively used in this manner, i.e. for processing liquid or semi-liquid substances in non-cylindrical and/or non-rigid containers, or for solid or semi-solid substances, a slight modification of the thrust bearing 51, i.e. by making it also a journal bearing, together with the introduction of some sliding or rolling supporting means for the inner vessel 44 at the top of the interspace canister 56 will permit every tier to be loaded to the maximum advantage.

I claim:

1. Apparatus for freeze drying a substance in cylindrical containers comprising an evacuable chamber; a hollow cylindrical member rotatably mounted in the evacuable chamber and containing refrigerant so that its outer cylindrical surface constitutes a cooling surface; rings surrounding the outer cylinder surface for mounting the containers in contact with the said outer cylindrical surface, a cylindrical bearing surface within the evacuable chamber against which the containers bear and means for rotating the cylindrical member about its axis.

2. Apparatus as claimed in claim 1 in which the cylindrical member is mounted with its axis inclined to the vertical.

3. Apparatus for freeze drying a substance in cylindrical containers comprising an evacuable chamber; a hollow member in the evacuable chamber and containing refrigerant so that its outer surface constitutes a cooling surface; a vacuum pump connected to evacuate the evacuable chamber, a heat exchanger connected to the vacuum pump exhaust to be heated by the exhaust gases therefrom and being located so as to heat the containers; and means for mounting the containers in contact with the said outer surface means for rotating the cylindrical member about its axis; and a condenser in the vacuable chamber.

4. Apparatus as claimed in claim 3 in which the heat exchanger is removably received in the said hollow member.

5. Apparatus for freeze drying substances contained in containers comprising an evacuable chamber, a coolant cylinder having one end open and the other closed and being rotatably mounted in the evacuable chamber with its axis inclined to the vertical and with the open end uppermost and open to atmosphere, mounting means whereby the containers may be mounted in contact with the external cylindrical surface of the coolant cylinder, an open ended condenser also mounted in the evacuable chamber, and a stand on which the evacuable chamber is mounted to pivot about a pivot axis from an erect position to two positions on either side of the said erect position, in one of which positions liquid coolant can flow from the cylinder to the condenser and in the other of which positions liquid coolant can flow from the condenser to the cylinder.

6. Apparatus as claimed in claim 5 further comprising a pouring extension on the condenser to guide liquid refrigerant into the cylinder when the evacuable chamber is in the said other position.

7. Apparatus as claimed in claim 6 further comprising an open trough-like receiver extension on the condenser to receive liquid refrigerant from the cylinders when the evacuable chamber is in the said one position.

8. Apparatus as claimed in claim 5 further comprising means for temporarily retaining the cylinder with different amounts of its exterior surface outside the evacuable chamber.

9. A method of freeze drying substances contained in cylindrical containers comprising mounting the containers on a cylindrical cooler which is rotatably contained in an evacuable container, the mounting being such that the axes of the containers are parallel to the axis of the cooler and on rotation of the cooler the containers rotate about their axes, pouring refrigerant from a condenser also mounted on the container into the cooler, rotating the cooler relative to the chamber, when the substances are frozen, returning the refrigerant to the condenser, and evacuating the evacuable chamber and, after freeze drying is complete, releasing the vacuum in the evacuable chamber.

References Cited by the Examiner

UNITED STATES PATENTS

| | | | |
|---|---|---|---|
| 1,969,104 | 8/1934 | Sibley | 62—381 |
| 2,284,875 | 6/1942 | Ladewig | 62—381 |
| 2,655,007 | 10/1953 | Lozar | 62—381 |
| 2,803,888 | 8/1957 | Cerletti | 34—5 |
| 3,192,643 | 7/1965 | Rieutord | 34—5 |
| 3,242,575 | 3/1966 | Manaresi | 34—92 |

WILLIAM J. WYE, *Primary Examiner.*